(12) United States Patent
Munjal et al.

(10) Patent No.: US 10,326,661 B2
(45) Date of Patent: Jun. 18, 2019

(54) RADIAL DATA CENTER DESIGN AND DEPLOYMENT

(71) Applicant: Microsoft Technology Licensing, LLC, Redmond, WA (US)

(72) Inventors: Ashish Munjal, Redmond, WA (US); Lee William Progl, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 15/382,253

(22) Filed: Dec. 16, 2016

(65) Prior Publication Data

US 2018/0176092 A1 Jun. 21, 2018

(51) Int. Cl.
*H04L 12/24* (2006.01)
*H04L 29/08* (2006.01)

(52) U.S. Cl.
CPC ...... *H04L 41/0893* (2013.01); *H04L 41/5019* (2013.01); *H04L 41/0803* (2013.01); *H04L 67/1097* (2013.01); *Y04S 40/162* (2013.01)

(58) Field of Classification Search
CPC ............. H04L 41/5003; H04L 41/5019; H04L 12/2634; H04L 47/822; H04L 47/821; H04L 47/805; H04L 41/5035; H04L 41/5016; H04L 12/24; G06F 9/5077
USPC .......... 370/226–241, 254–401; 709/201–229
See application file for complete search history.

(56) References Cited

U.S. PATENT DOCUMENTS

| | | | | |
|---|---|---|---|---|
| 7,961,463 B2 * | 6/2011 | Belady | ............... | H05K 7/20745 312/223.6 |
| 8,032,767 B2 * | 10/2011 | Belady | .................... | G06F 1/206 713/300 |
| 8,305,757 B2 | 11/2012 | Keisling et al. | | |
| 8,549,869 B1 | 10/2013 | Whitted et al. | | |
| 9,173,327 B2 * | 10/2015 | Wiley | ....................... | G06F 1/20 |
| 9,404,265 B2 * | 8/2016 | Gliessman | .............. | F24F 5/005 |
| 2002/0194324 A1 * | 12/2002 | Guha | ...................... | H04L 29/06 709/223 |
| 2008/0094797 A1 | 4/2008 | Coglitore et al. | | |
| 2009/0307334 A1 | 12/2009 | Maltz et al. | | |
| 2012/0134678 A1 | 5/2012 | Roesner et al. | | |
| 2012/0162906 A1 | 6/2012 | Jai | | |
| 2013/0120931 A1 | 5/2013 | Sankar et al. | | |
| 2013/0283374 A1 * | 10/2013 | Zisapel | ............... | H04L 63/1441 726/22 |
| 2014/0137491 A1 | 5/2014 | Somani et al. | | |
| 2014/0185225 A1 * | 7/2014 | Wineland | .................. | G06F 1/20 361/679.31 |
| 2014/0345207 A1 | 11/2014 | Gliessman | | |
| 2014/0368991 A1 | 12/2014 | James et al. | | |

(Continued)

OTHER PUBLICATIONS

Miller, Rich, "Wild New Design: Data Center in a Silo", Published on: Dec. 10, 2009 Available at: http://www.datacenterknowledge.com/archives/2009/12/10/wild-new-design-data-center-in-a-silo/.

(Continued)

*Primary Examiner* — Man U Phan
(74) *Attorney, Agent, or Firm* — Workman Nydegger

(57) ABSTRACT

Illustrated herein is a substantially circular data center including a plurality of machines. The machines are physically grouped into data classification groups. The data classification groups are organized in a radially expanding and circumferential fashion.

18 Claims, 10 Drawing Sheets

(56) References Cited

U.S. PATENT DOCUMENTS

| | | | |
|---|---|---|---|
| 2015/0241943 A1 | 8/2015 | Allen-Ware et al. | |
| 2016/0021437 A1* | 1/2016 | Stroetmann | G06F 1/1658 398/50 |
| 2016/0197850 A1* | 7/2016 | Peng | H04L 41/5003 709/226 |
| 2016/0359917 A1* | 12/2016 | Rao | H04L 63/1425 |
| 2017/0201597 A1* | 7/2017 | Narasimhan | H04L 67/327 |
| 2018/0101214 A1* | 4/2018 | Mahindru | G06F 1/329 |
| 2018/0180309 A1* | 6/2018 | Gliessman | F24F 5/005 |

OTHER PUBLICATIONS

Thibodeau, Patrick, "Envisioning a 65-story data center", Published on: Apr. 12, 2016 Available at: http://www.computerworld.com/article/3054603/data-center/a-65-story-data-center-design-that-soars-with-ideas.html.

* cited by examiner

RADIAL DATA CENTER DESIGN AND DEPLOYMENT

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Further, this interconnection has facilitated the ability to provide large amounts of data using services configured to provide the data.

To provide cloud services, many providers do so using so called data centers. A data center is a physical collection of computing machines (i.e., servers) having compute, memory, and storage resources that can be provided to cloud subscribers. Data centers can also be used for services for providing data to users.

Data centers are typically very large facilities hosting a large number of machines. As one might imagine, there is often a need to upgrade and repair machines in a data center. This is often done in a gradual way because of the size of the data centers and sheer numbers of machines.

Due to the physical configuration of modern data centers, deployment, repair and decommissioning of data center machines often results in fragmented installations. Namely, different machines that might be working together in a coordinated system could be scattered across the data center. Thus, troubleshooting a given coordinated system could require the need for technicians to physically visit different parts of the data center. Further, if there are critical portions of the data center that may need to be protected, such as by physically protecting certain systems, this can be difficult if those portions are scattered throughout the data center.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a substantially circular data center including a plurality of machines. The machines are physically grouped into data classification groups. The data classification groups are organized in a radially expanding and circumferential fashion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein implement a substantially circular data center design. For example, the data center may be implemented in a substantially circular facility, such as a building. In some embodiments, machines can be grouped together by data classification. The data classification groups are organized radially and circumferentially. Thus, a machine in a group will be physically located at some radius in a group of radii designated for the particular group, and along some circumferential arc, among a group of arcs designated for the particular group. A machine's group can be determined if the radial distance from the center of the data center, and location along an arc are known. In the examples illustrated herein, data classification is by business importance. For example, machines may be grouped by low business importance, medium business importance, and high business importance (HBI). While these three levels are shown, it should be appreciated that in other embodiments, other levels or classifications of machines may be grouped. Additionally, embodiments may be arranged such that machine upgrade deployments can be performed radially. In this way similar machines can be grouped together even when upgrades are performed. The deployments include a buffer space that allows for new machines in a group to be commissioned as old machines in a group are decommissioned.

Figure 1:
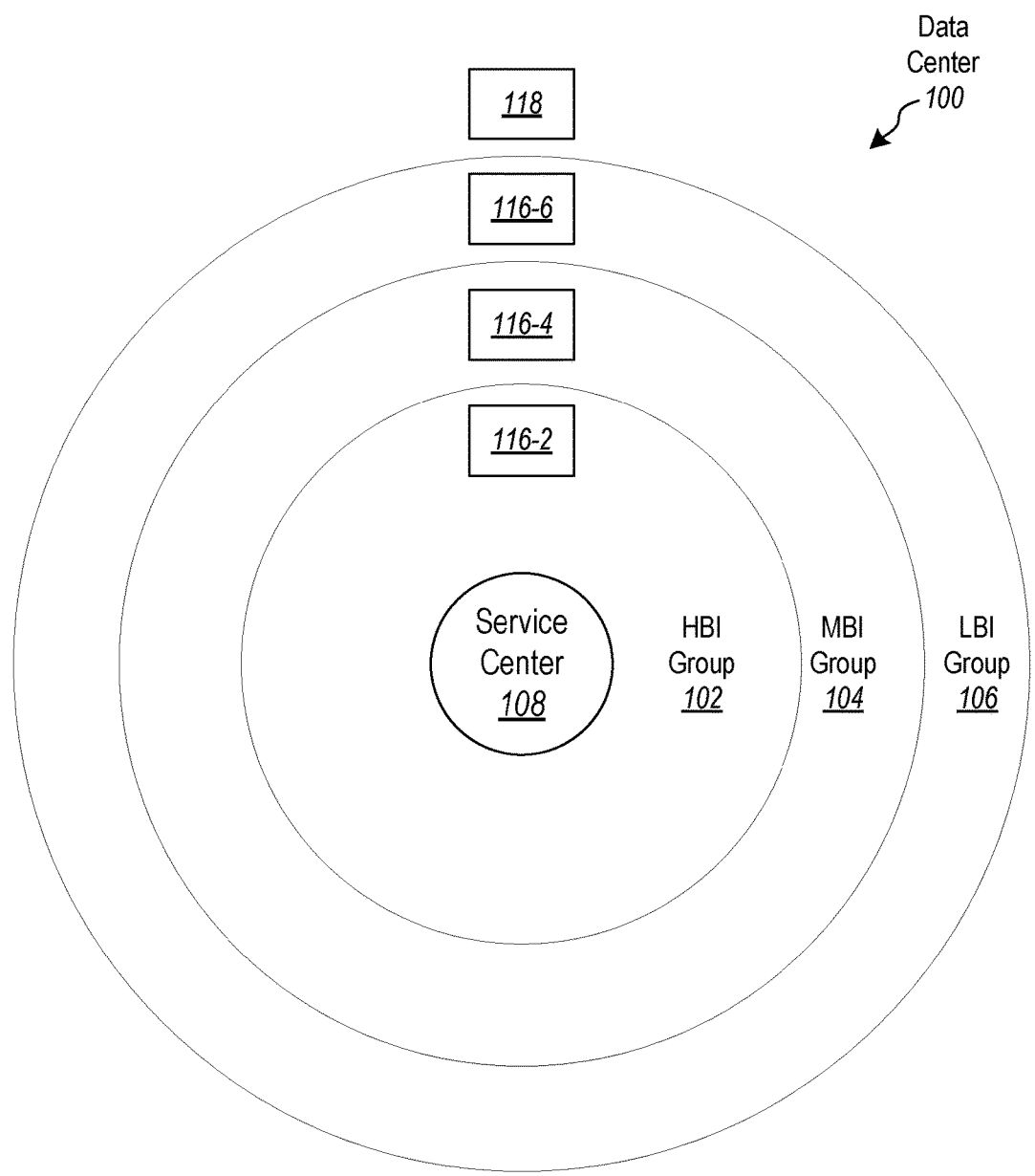
FIG. 1 illustrates a circular data center.

Referring now to FIG. 1, an example embodiment is illustrated. FIG. 1 illustrates a data center 100. The data center 100 is arranged in a substantially concentric, e.g., circular, fashion. Machines are further grouped in a radial fashion. For example, FIG. 1 illustrates three groups with each group grouped radially. In this example, the three groups are a high business importance group 102, a medium business importance (MBI) group 104 and a low business importance (LBI) group 106. Note that in other embodiments, more or fewer groups may be implemented.

In some embodiments, the groups are strategically located in the data center 100. For example, in some embodiments a group may be strategically located towards the center of the data center 100 with respect to other groups. This can be done for a number of different reasons and provide a number of different advantages.

For example, the HBI group 102 may include data or functionality that is more important than data or functionality implemented by other groups. Thus, there may be a need to provide more protection, more serviceability, prioritized power and/or cooling, etc. Much of this can be accomplished by strategic group placement in the data center 100.

For example, in some embodiments a group, such as HBI group 102 may be located towards the center of the data center 100 to provide physical security. In particular, a physical attacker, natural disaster, or other physical phenomenon will need to penetrate deeper into the data center 100 to affect the HBI group 102 than would be needed for other groups, such as the MBI group 104 and the LBI group 106.

In another example, the data center 100 may include a service center 108 in the center of the data center 100. The service center 108 may include physical office space for technicians, spare machine parts, connection equipment, and other maintenance equipment. By having the HBI group 102 near the center, near the service center 108, maintenance can be performed more quickly for the HBI group 102 as compared to the MBI group 104 and the LBI group 106.

In yet another example, as will be shown in more detail below, some embodiments may be able to implement prioritized cooling and power functionality. In particular, cooling and/or power can be directed to a particular part of the data center to prioritize cooling and/or power for one or more groups of the data center.

Figure 2:
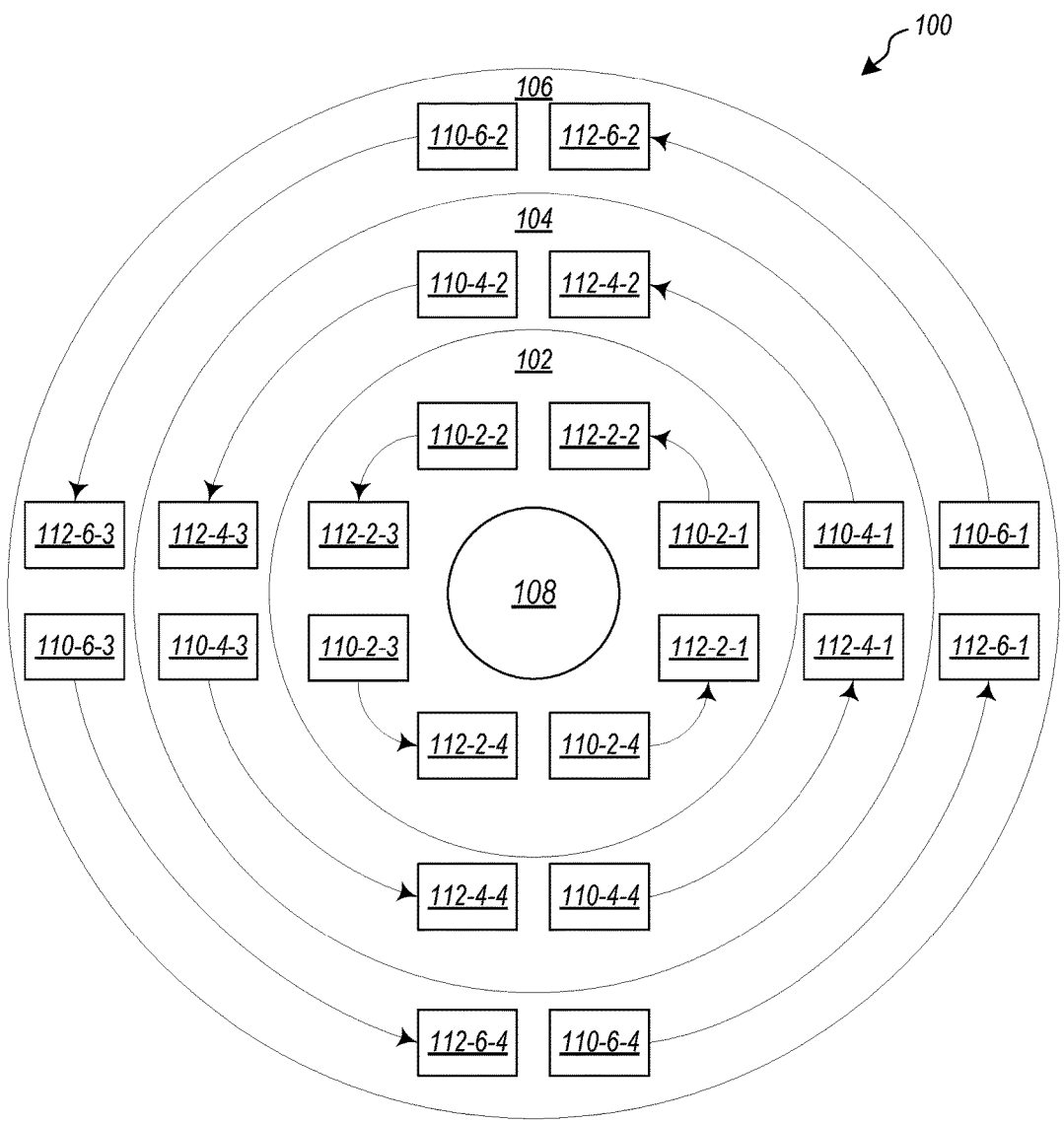
FIG. 2 illustrates a circular data center with cooling.

For example, FIG. 2 illustrates an example cooling design. In particular, FIG. 2 illustrates circular counterclockwise airflow in the data center 100. In the example illustrated, this is accomplished by an arrangement of supply ducts and return ducts. FIG. 2 illustrates supply ducts 110-2-1 through 110-2-4 for HBI group 102, 110-4-1 through 110-4-4 for MBI group 104 and supply ducts 110-6-1 through 110-6-4 for LBI group 106. FIG. 2 also illustrates return ducts 112-2-1 through 112-2-4 for HBI group 102, return ducts 112-4-1 through 112-4-4 for MBI group 104 and return ducts 112-6-1 through 112-6-4 for LBI group 106. Cooling air flows from a supply duct to a corresponding return duct. Air flowing into a return duct is cooled by one or more cooling units and then provided to the one or more supply ducts. While the particular arrangement is illustrated, it should be appreciated that other duct arrangements could be implemented and the example shown is only for demonstration purposes. In the illustrated example, cooling is substantially equal for the various groups in the data center 100. However, there may be a need to prioritize cooling to at least one portion of the data center 100 while de-emphasizing cooling for at least one other portion of the data center.

Figure 3:
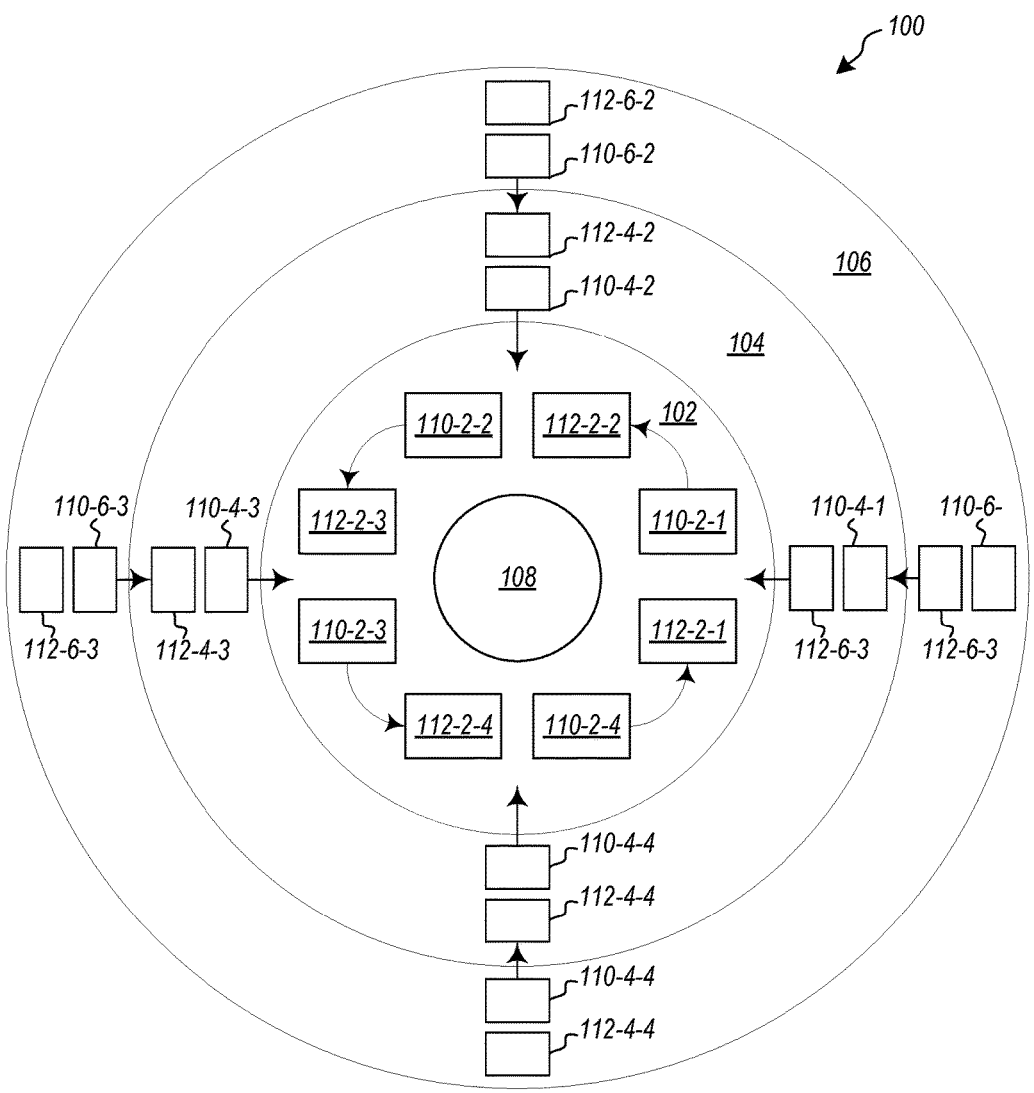
FIG. 3 illustrates a circular data center with prioritized cooling.

An example of this is illustrated in FIG. 3. In the example illustrated in FIG. 3, the supply ducts 110-4-1 through 110-4-4 for MBI group 104, supply ducts 110-6-1 through 110-6-4 for LBI group 106, return ducts 112-4-1 through 112-4-4 for MBI group 104, and return ducts 112-6-1 through 112-6-4 for LBI group 106 are arranged such that cooling air flow is directed towards the center of the data center 100 such that cooling can be prioritized for the HBI group 102. Note that in other embodiments, the supply and return ducts can be directed to prioritize cooling in other parts and for other groups in the data center.

In particular, supply and return ducts can be selectively adjustable to prioritize how cooling is accomplished in the data center 100. This may be accomplished using various mechanized ducting systems or mechanical equipment orienting system to adjust air flow directions.

Note that in some embodiments, cooling equipment may be separately controllable. For example, cooling equipment in different parts of the data center 100 may be able to be controlled separately. Thus for example, in some embodiments, cooling equipment for the HBI group 102 can be controlled separately from cooling equipment for the MBI Group 104, which can be controlled separately from the cooling equipment for the LBI Group 106. Further, equipment within a group may be controlled separately from other equipment in the group. This may be useful, for example, when there is a limited amount of power to power cooling equipment. In some embodiments, certain preferred portions of the data center 100 can be cooled with separately controlled cooling equipment while other portions of the data center 100 would have cooling equipment deactivated for those portions of the data center 100. In this way, limited amounts of power could be used to cool particular portions of the data center 100 to keep those portions operating when needed.

Similar embodiments may be used to control humidity in the various parts of the data center. In particular, embodiments may use air conditioners coupled to the return ducts to remove moisture from, or add moisture to, cooling air. Humidity control can thus be prioritized in a fashion to how cooling is prioritized as illustrated above.

Power distribution can also be prioritized and/or distributed by group. For example, in the example illustrated in FIG. 1 a first set of power distribution equipment 116-2 (such as power conditioners, power supplies, circuit breakers, surge suppressors, etc.) can be provided for machines in HBI group 102, a second set of different power distribution equipment 116-4 can be provided for machines in MBI group 104, and a third set of different power distribution equipment 116-6 can be provided for machines in LBI group 106.

Each of these different sets may be connected to a mainline power distribution system 118 which feeds power to the entire data center 100. In cases where power may be limited to the mainline power distribution system 118, power can be prioritized to different groups. For example, if there is limited power available to the mainline power distribution system 118, the mainline power distribution system 118 may distribute power to the set of power distribution equipment 116-2 for the HBI group 102, but may prevent power from being distributed to the set of power distribution equipment 116-4 and set of power distribution equipment 116-6 for MBI group 104 and LBI group 106 respectively.

Note that power may be further subdivided within a particular group. For example, additional sets of power distribution equipment can be provided for subsets of a particular group. Thus power can be prioritized for a particular subset of a group by supplying power to a particular power distribution equipment subset while preventing power from being delivered to other power distribution equipment subsets. This can allow power to be routed to particularly important machines or to other equipment as desired by system administrators for the data center 100.

Referring now to FIGS. 4-8, examples of radial deployment and decommissioning are illustrated. In particular, these figures illustrate how a radial deployment and decommissioning design can be used to efficiently deploy and decommission machines in the data center.

Figure 4:
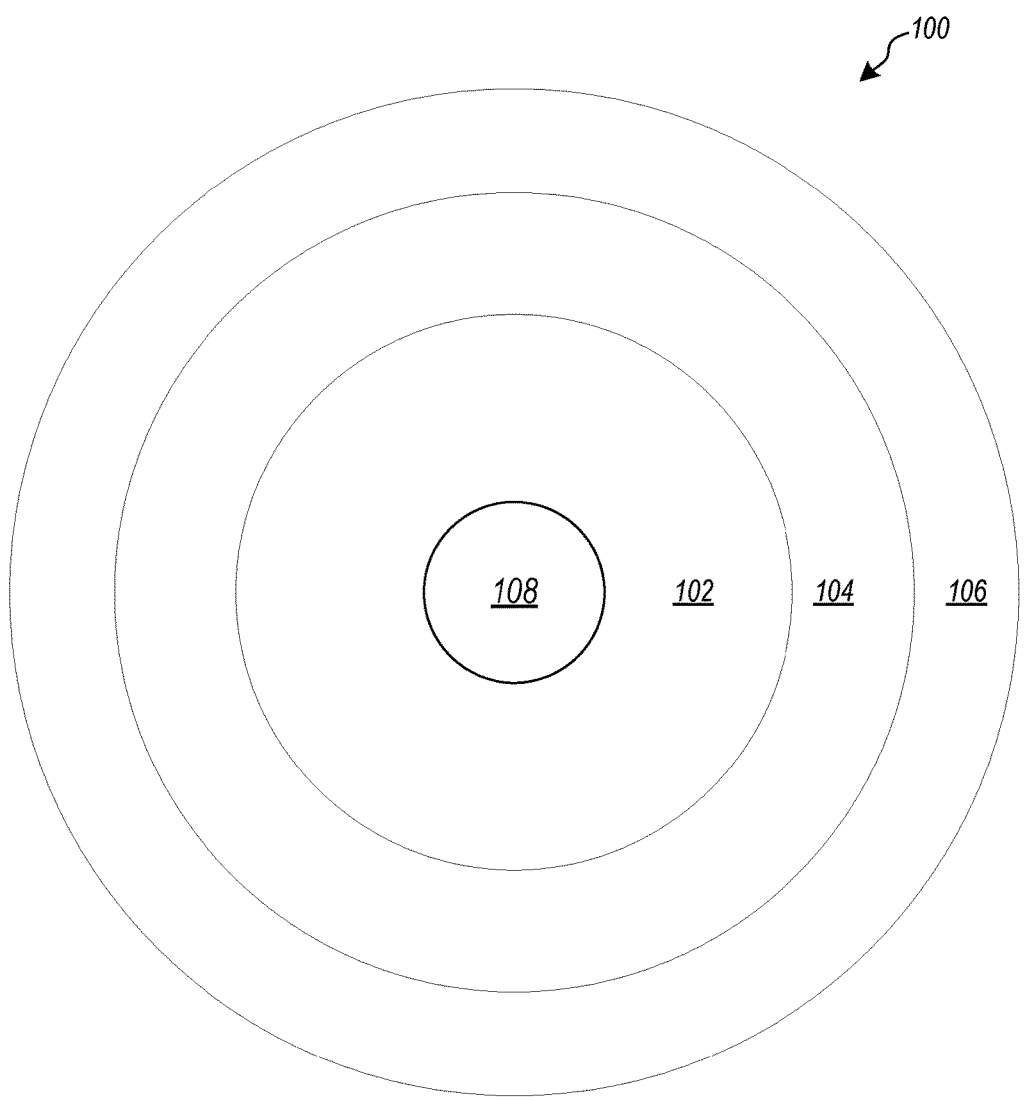
FIG. 4 illustrates a substantially empty circular data center.
Figure 5:
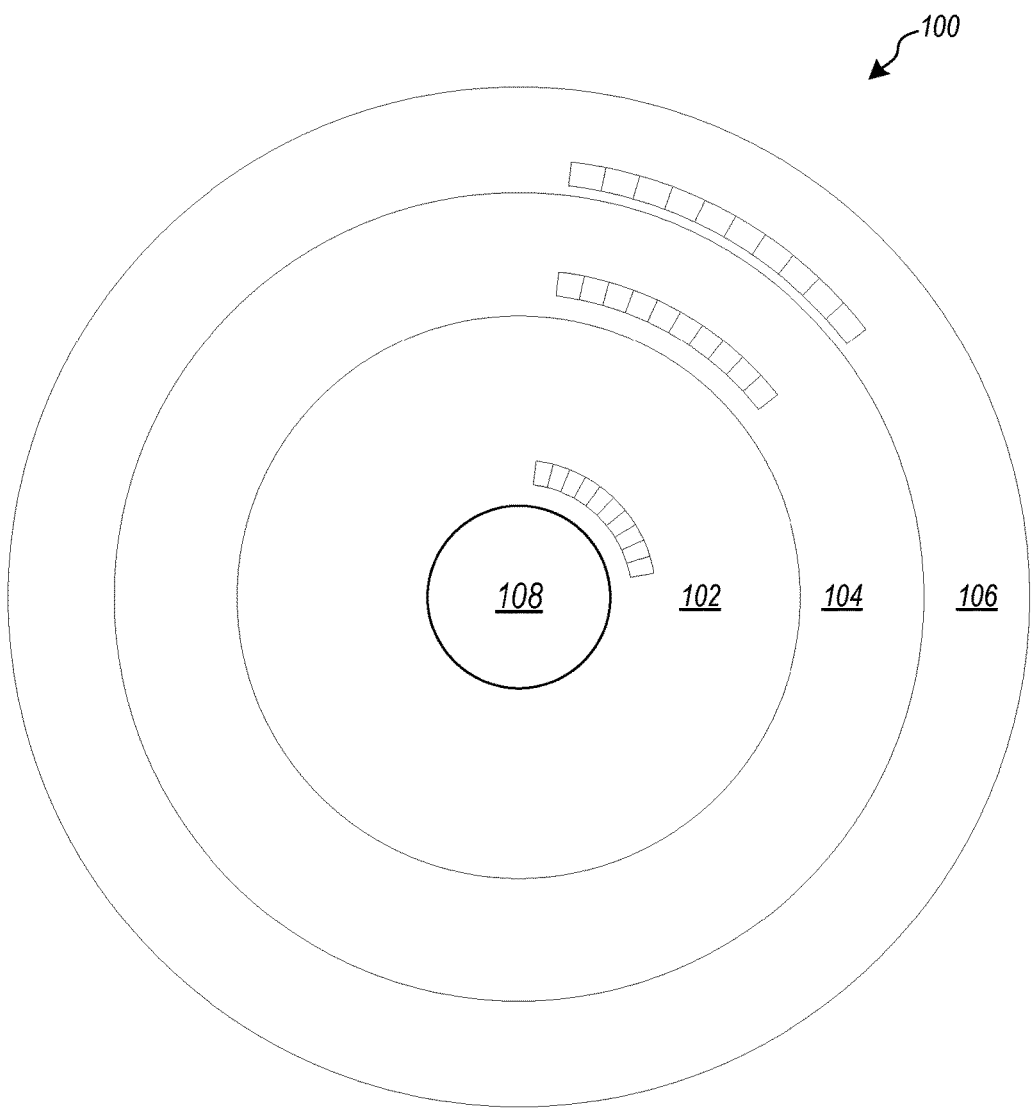
FIG. 5 illustrates a circular data center with partial machine deployment.

FIG. 4 illustrates the data center 100 in a new state with no machines deployed in the data center. The data center 100 is nonetheless organized into different groups, including the HBI group 102, MBI group 104 and LBI group 106. FIG. 5 illustrates that machine deployments can be begun in each of the groups. Note that machines typically have a useful lifespan. This is often on the order of about two to three years. In some embodiments, deployment plans can be implemented that anticipate taking a period of time about equal to the useful lifespan of machines to fill a group. Once a group has been filled, as illustrated in more detail below, the oldest machines can be decommissioned and new deployments made in their place.

Figure 6:
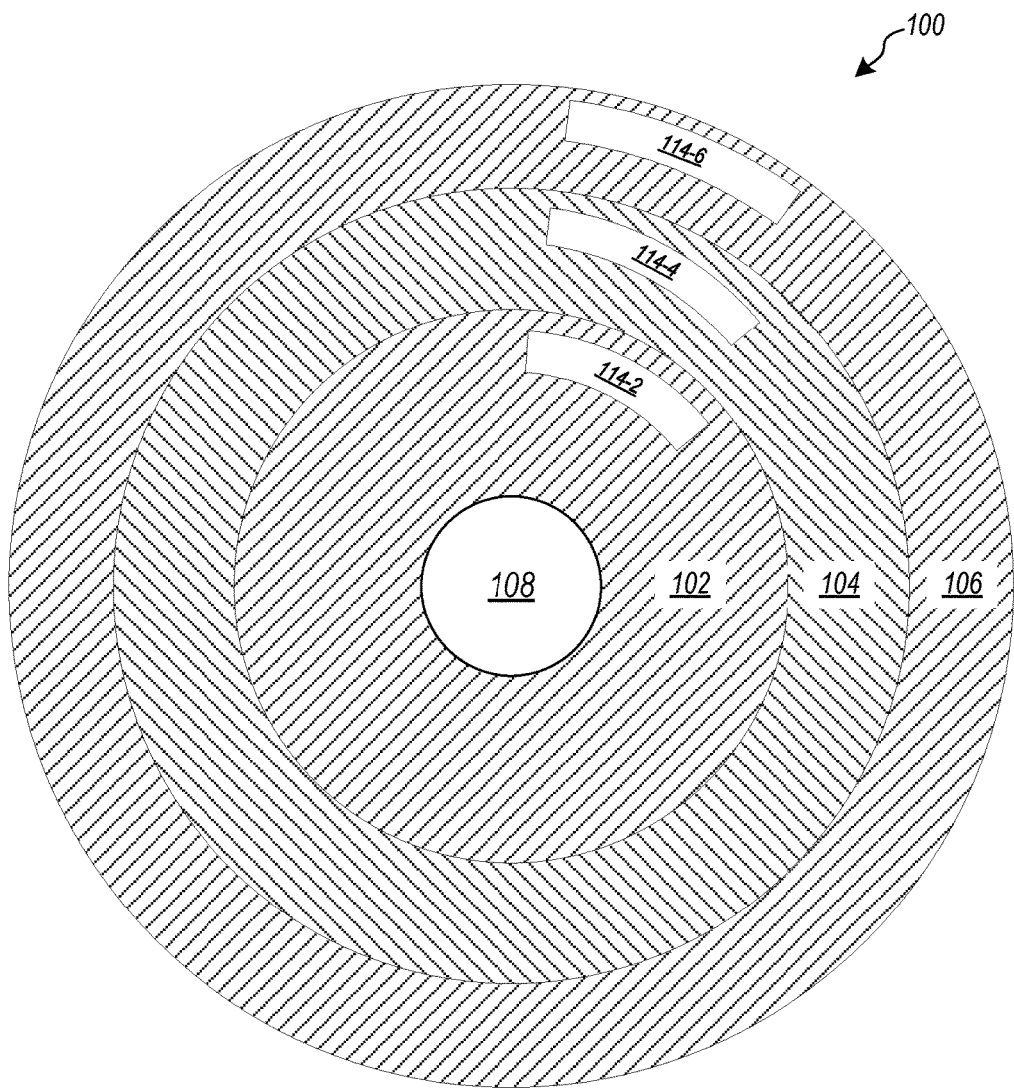
FIG. 6 illustrates a circular data center at deployment capacity.

For example, FIG. 6 illustrates an example where the data center 100 has been filled to capacity with machines. Note that capacity may include buffer zones 114-2, 114-4 and 114-6 where additional machines can be deployed, but where machines are not deployed until already deployed machines have been decommissioned. This allows for time for the physical deployment of machines while other machines are being decommissioned.

Figure 7:
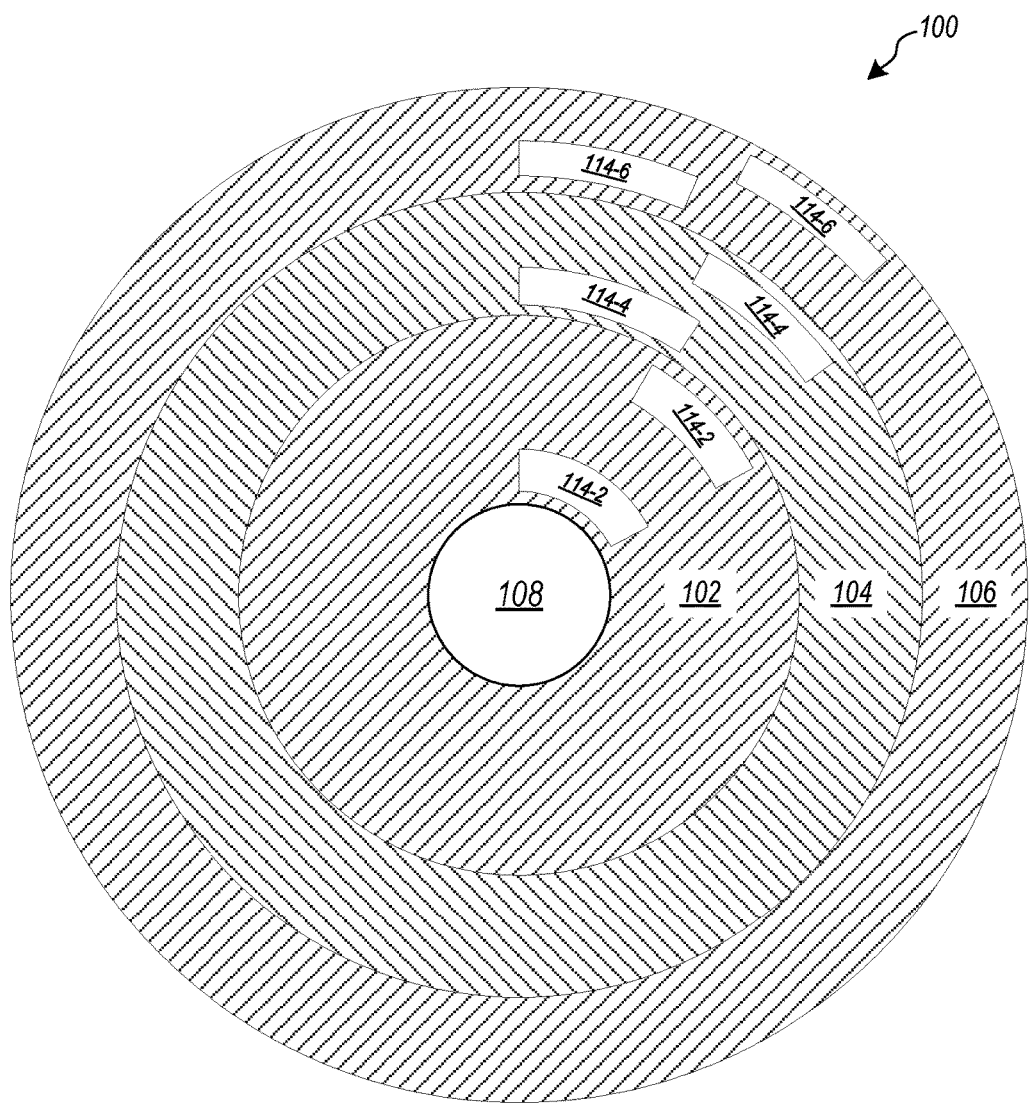
FIG. 7 illustrates a circular data center at deployment capacity with new machines being deployed into a buffer zone and older machines being decommissioned.

For example, FIG. 7 illustrates where some of the first machines to be deployed are decommissioned and portions of the buffer zones 114-2, 114-4 and 114-6 are moved into the physical locations of those machines. New machines are deployed in the physical locations where portions of the buffer zones 114-2, 114-4 and 114-6 previously existed. Thus, the buffer zones remain approximately a constant size, but move in an orderly fashion as machines are commissioned and decommissioned. Thus, the buffer zones 114-2, 114-4 and 114-6 move as a unit circumferentially and radially inward or outward as needed. For example, FIG. 7 shows an inward radial movement of the buffer zones 114-2, 114-4 and 114-6 to move the buffer zones 114-2, 114-4 and 114-6 to a location where machines were first deployed (as illustrated in FIG. 5) and now being decommissioned, and a clockwise circumferential movement of the buffer zones 114-2, 114-4 and 114-6 as machines are decommissioned.

Figure 8:
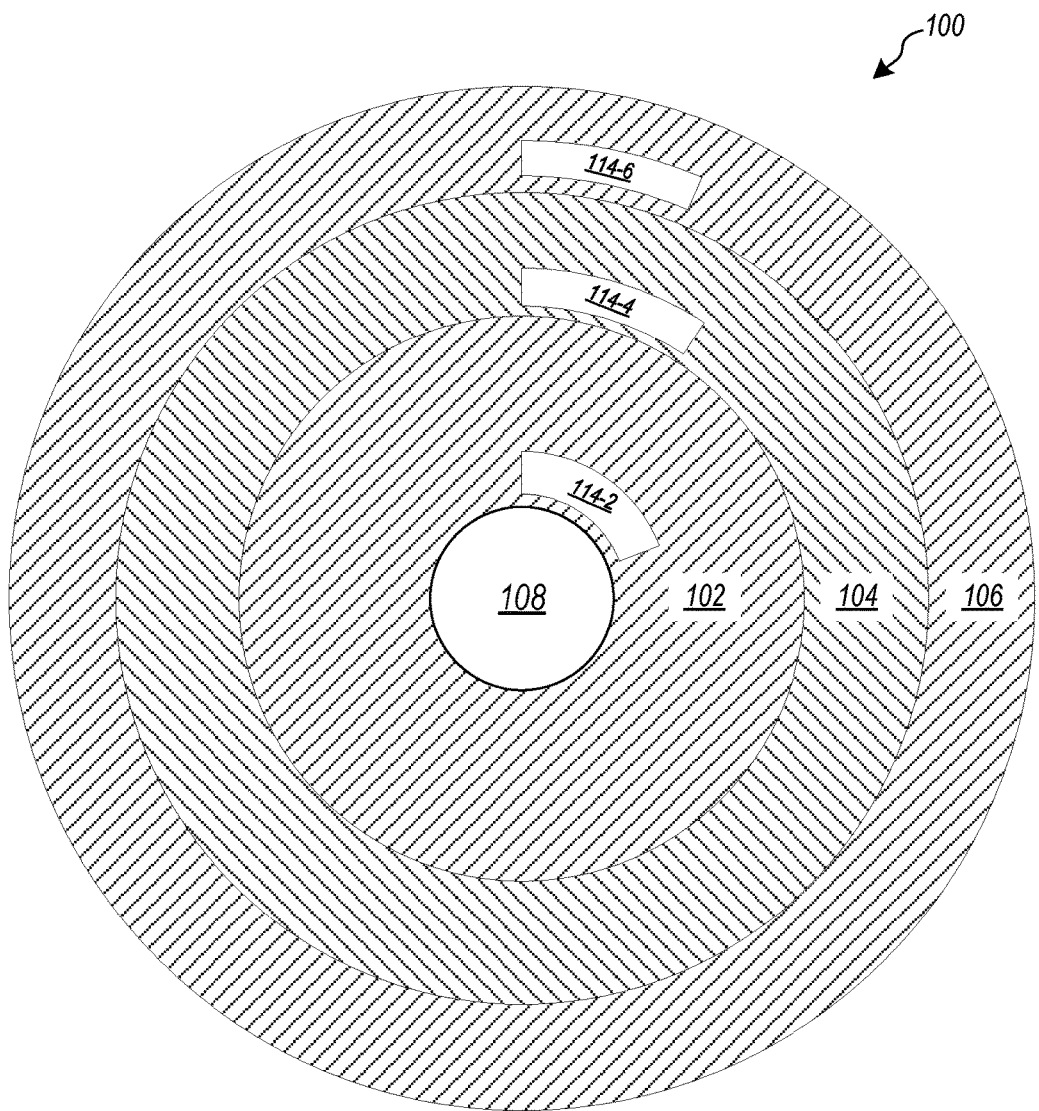
FIG. 8 illustrates a circular data center at full deployment with buffer zones positioned for expansion of data classification groups.

Note that in some embodiments, this deployment and decommissioning strategy can be used to grow or shrink a group. This can be done by a first group deploying machines into the buffer zone of a different group. This will typically occur when the buffer zone of the different group is directly adjacent to the first group. An example is illustrated in FIG. 8. For example, FIG. 8 illustrates that the buffer zone 114-4 of the second group 104 is adjacent to the first group 102. Machines can be deployed for the first group 102 into the buffer zone 114-4 of the second group as machines are decommissioned in the second group 104. Once a desired expansion of the first group 102 has occurred, new deployments for the second group 104 can be made into the buffer zone 114-4 as machines are decommissioned in the second group 104.

Referring once again to FIG. 1, the service center 108 is illustrated. IT staff and equipment can be located at the service center 108. This can have several advantages and can be used for strategic placement of machines. For example, high priority machines can be located near the center of the data center 100 which allows staff to be located in close proximity.

Additionally or alternatively, having the service center 108 at the center of the data center 100 can create an environment where performing service at the data center 100 can be deterministic in nature. In particular, a deterministic calculation can be performed to determine an amount of time that servicing a machine will occur in the data center 100. This can be based, for example, on the distance of the machine from the service center 108 in the data center 100. In particular, embodiments may be able to deterministically determine a travel time for a technician from the service center 108 to a machine in the data center 100. This can be used for defining and/or servicing service level agreements. For example, machines may be placed in the data center 100 according to service level agreement requirements. For example, machines having stricter service level requirements (e.g., lower percent down times, faster servicing of faults, etc.) may be located closer to the service center 108 than other machines. Thus, in some embodiments, the data classification may be associated with, or defined by a service level agreement.

Indeed, some embodiments may select a radial distance from the service center 108 based on the particular service level agreement. Thus, embodiments may determine a service level agreement applicable to a machine, and then deploy the machine at or below a particular radial distance to be able to meet the service level agreement. Note that in some embodiments, there may be a desire to optimize the radial distance of the machine to the service level agreement. Thus, there may be both an upper threshold and a lower threshold for radial distance corresponding to a particular service level agreement. In particular, the radial distance must be sufficiently short to allow for service technicians to be able to physically access the machines in a sufficient amount of time for the service level agreement to be met. But it may also be desirable to not make the distance below some threshold as the service level provided might far exceed (according to some predetermined threshold) the service level agreement, thus needlessly using valuable maintenance resources.

In an alternative or additional embodiment, service levels may be offered based on machine location in the data center 100. In particular, a radial distance from the service center 108 may be identified for a machine. This radial distance may be used for determining the service level agreement that is able to be offered for the particular machine. Thus, in some embodiments, a radial distance of a machine is identified. As a result of this identification, a customer using the machine will automatically be notified of the service level that is able to be provided from that machine. In some embodiments, machines deployed in the service center may have data center location information embedded therein. This information could be used to automatically respond to queries from customers to provide service level information. In particular, a customer could request service level information from a machine at the data center 100. The machine would consult its location information, and respond to the customer to identify a service level that can be provided by the machine.

A customer could use this information for load balancing, prioritized data handling, or for other reasons. In particular, if a customer of the data center 100 is using several different machines at the data center 100, the customer could request service level information from each of the different machines used by the customer. Based on the available service level, the customer could assign computing tasks to the various machines.

The circular design of the data center 100 also allows for simplified cabling and equipment requirements. In particular, all machines located at a particular radial distance from the service center 108 will have similar cabling and other equipment requirements. Thus a technician knowing the location of a particular machine in the data center 100 will know the sizes and types of cables and other equipment needed to deploy a machine in the data center 100. In particular, while previous systems in traditional data centers required technicians to perform individual measurements and assessments for each machine deployed, at the time of deployment, embodiments herein can facilitate a more universal installation approach. In particular, a technician can determine the radial distance at which a machine will be deployed in the data center, and that radial distance will dictate the cabling and other equipment needed to deploy the machine.

Similarly, if cabling and/or equipment needs to be replaced for a particular machine, the radial distance of the machine in the data center can be determined and a technician can then determine the length of cabling and type of equipment needed to perform appropriate maintenance. In this way, the technician can limit the amount of equipment that needs to be physically transported to a machine to perform maintenance tasks on the machine in the data center 100.

Some embodiments illustrated herein may use the Internet of Things (IoT) to detect and identify issues in the data center 100. For example, in some embodiments, a machine located in a particular portion of the data center 100 can identify certain environmental conditions. This information can be relayed to the service center 108 such that technical support personnel can address the various issues in the data center 100.

Figure 9:
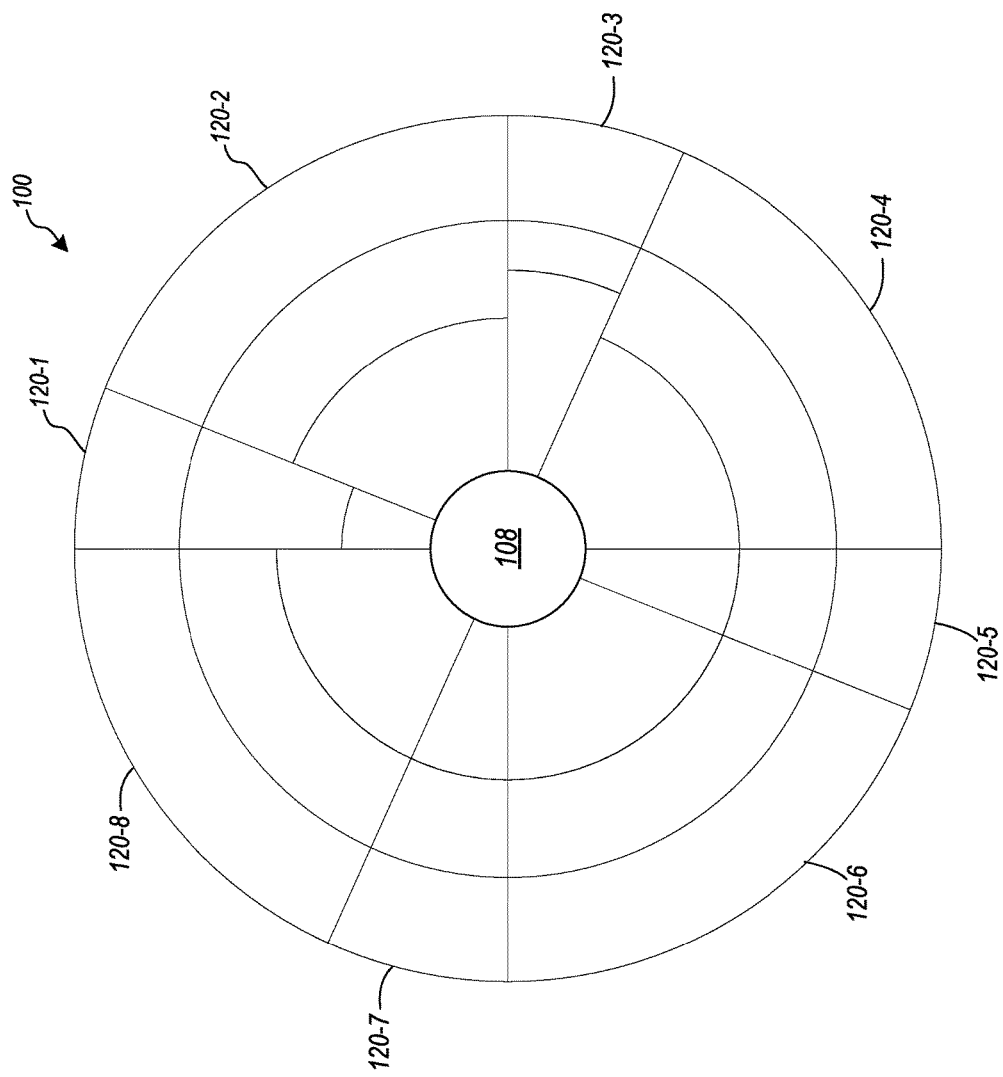
FIG. 9 illustrates a circular data center organized by columns.

While the examples illustrated herein have shown that machine deployment, group, and machine maintenance is based on concentric circular topologies, it should be appreciated that in some embodiments columns can be used to implement similar functionality. For example, in some embodiments, the data center 100 can be divided into quadrants wherein each quadrant is treated in a similar fashion to how the entire data center is shown above for concentric deployment and servicing. Alternatively, or additionally, in some embodiments various sized columns can be used such as those columns 120-1 through 120-8 illustrated in FIG. 9. In this case, radial expansion and deployment works in a S fashion similar to that shown above except that it is performed on a column by column basis as illustrated in FIG. 9. In particular, each column may have different groups in the column. Additionally, machines can be deployed into buffer zones where each group in each column will have an appropriate buffer zone. Additionally, or alternatively, groups within a column can be grown or reduced in size in a fashion similar to that illustrated above.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
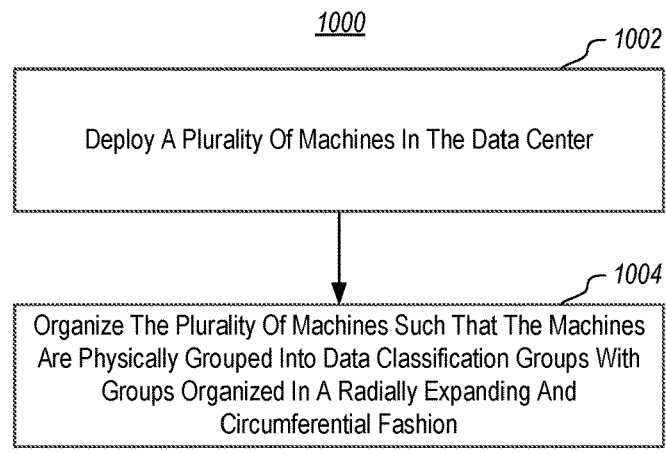
FIG. 10 illustrates a method of deploying machines in a circular data center.

Referring now to FIG. 10, a method 1000 is illustrated. The method 1000 includes acts for implementing a data center. The method 1000 includes deploying a plurality of machines in the data center (act 1002).

The method 1000 further includes organizing the plurality of machines such that the machines are physically grouped into data classification groups with groups organized in a radially expanding and circumferential fashion (act 1004). Thus, for example, as illustrated in FIG. 1, the data classifications are HBI, MBI and LBI. However, other classifications may be by service level agreement or other appropriate classifications. Thus, in some embodiments, the method 1000 may be practiced where organizing the plurality of machines such that the machines are physically grouped into data classification groups comprises organizing the groups based on service level agreements for machines in the groups.

The method of claim 10, may further include deploying machines within a group in a fashion where deployment follows de-commissioning machines in the same group. Thus, for example, as illustrated in FIGS. 6 and 7, buffer zones can be expanded or moved by decommissioning machines and machines can be deployed into the buffer zones as illustrated.

The method 1000 may further include providing cooling that is configurable such that it can be controlled on a data classification basis. For example, FIG. 2 illustrates cooling hardware configured to cool based on machine groupings.

The method may further include changing airflow from a circumferential path to an inwardly radial path. FIG. 3 illustrates an example of how this might be accomplished in some embodiments.

The method 1000 may further include providing humidity control that is configurable such that it can be controlled on a data classification basis.

The method 1000 may further include providing power distribution that is configurable such that it can be controlled on a data classification basis.

The method 1000 may be practiced where organizing the plurality of machines comprises organizing machines that are determined to belong to a higher value data classification group than other groups in the data center toward a center of the data center. Thus, for example, as illustrated in FIG. 1, HBI group 102 is more toward the center of the data center 100 than MBI group 104 and LBI group 106 based on a determination that the HBI group 102 is of higher value than MBI group 104 and LBI group 106.

The method 1000 may further include providing a service center located at the center of the data center. Thus, as illustrated in FIG. 1, a service center 108 may be provided at the center of the data center 100.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data center comprising:
   a plurality of machines, each machine being a member of one of a plurality of data classification groups;
   the data center being physically arranged in a radial design that includes a plurality of circumferential arcs, each circumferential arc being situated at a particular and distinct radial distance from the center of the data center;
   wherein all machines in a particular data classification group are physically located in a particular circumferential arc; and
   wherein machines that are determined to belong to a higher value data classification group than machines in a second classification group in the data center are located closer to the center of the data center than the machines in the second classification group.

2. The data center of claim 1, wherein the data classification groups are based on service level agreements.

3. The data center of claim 1, wherein machines are arranged such that deployments of machines within a group follow de-commissioning machines in the same group.

4. The data center of claim 1, further comprising cooling that is configurable such that it can be controlled on a data classification basis.

5. The data center of 4 wherein airflow can be changed from a circumferential path to an inwardly radial path.

6. The data center of claim 1 comprising humidity control that is configurable such that it can be controlled on a data classification basis.

7. The data center of claim 1 comprising power distribution that is configurable such that it can be controlled on a data classification basis.

8. The data center of claim 1 further comprising a service center that is located at the center of the data center.

9. A method of implementing a data center, the method comprising:
- deploying a plurality of machines in the data center, each machine being a member of one of a plurality of data classification groups;
- the data center being physically arranged in a radial design that includes a plurality of circumferential arcs, each circumferential arc being situated at a particular and distinct radial distance from the center of the data center;
- organizing the plurality of machines such that all machines in a particular data classification group are physically located in a particular circumferential arc; and
- wherein organizing the plurality of machines comprises organizing machines that are determined to belong to a higher value data classification group than machines in a second classification group in the data center closer to the center of the data center than the machines in the second classification group.

10. The method of claim 9, wherein organizing the plurality of machines such that the machines are physically grouped into data classification groups comprises organizing the groups based on service level agreements for machines in the groups.

11. The method of claim 9, further comprising deploying machines within a group in a fashion where deployment follows de-commissioning machines in the same group.

12. The method of claim 9, further comprising providing cooling that is configurable such that it can be controlled on a data classification basis.

13. The method of claim 12, further comprising changing airflow from a circumferential path to an inwardly radial path.

14. The method of claim 9, further comprising providing humidity control that is configurable such that it can be controlled on a data classification basis.

15. The method of claim 9, comprising providing power distribution that is configurable such that it can be controlled on a data classification basis.

16. The method of claim 9, further comprising providing a service center located at the center of the data center.

17. The method of claim 9, further comprising expanding a data first classification group by deploying machines into a buffer zone of a different group wherein the buffer zone of the different group is adjacent to the first classification group.

18. A data center comprising:
- a substantially circular facility;
- a service center located at approximately the center of the facility;
- a first group of machines organized radially beyond the service center and circumferentially concentric, the first group of machines all being members of a first common data classification group; and
- a second group of machines organized radially beyond the first group of machines and circumferentially concentric, the second group of machines all being members of a second common data classification group;
- wherein the first group of machines are located closer to the center of the facility because the first common data classification group is classified at a higher value than the second common data classification group.

* * * * *